(12) United States Patent
Tanaka

(10) Patent No.: US 7,290,996 B2
(45) Date of Patent: Nov. 6, 2007

(54) TIRE VULCANIZING MOLD

(75) Inventor: Hideaki Tanaka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/407,919

(22) Filed: Apr. 21, 2006

(65) Prior Publication Data

US 2006/0188593 A1 Aug. 24, 2006

Related U.S. Application Data

(62) Division of application No. 10/073,409, filed on Feb. 13, 2002, now abandoned.

(30) Foreign Application Priority Data

Feb. 15, 2001 (JP) ............................. 2001-037939

(51) Int. Cl.
*B29C 35/02* (2006.01)
(52) U.S. Cl. .................. 425/46; 425/28.1; 425/812
(58) Field of Classification Search ............ 425/28.1, 425/46, 812; 249/141
See application file for complete search history.

(56) References Cited

U.S. PATENT DOCUMENTS

| | | | |
|---|---|---|---|
| 2,756,460 A | 7/1956 | Heintz | |
| 3,377,662 A | 4/1968 | Fukushima | |
| 3,804,566 A | 4/1974 | Kimura et al. | |
| 3,941,528 A | 3/1976 | Cotterell | |
| 4,553,918 A | 11/1985 | Yoda et al. | |
| 4,576,559 A * | 3/1986 | Yoda et al. | 425/812 |
| 5,066,209 A | 11/1991 | Schmaderer et al. | |
| 5,368,799 A | 11/1994 | Galli et al. | |
| 5,415,826 A | 5/1995 | Lange et al. | |
| 5,431,873 A * | 7/1995 | Vandenberghe | 425/812 |
| 5,800,642 A * | 9/1998 | Ohya | 425/812 |
| 6,367,765 B1 | 4/2002 | Wieder | |

FOREIGN PATENT DOCUMENTS

| | | | |
|---|---|---|---|
| JP | 4-12813 | * | 1/1992 |
| JP | 05-138656 | | 6/1993 |
| JP | 08-020026 | | 1/1996 |
| JP | 08-072061 | | 3/1996 |
| JP | 10-071617 | | 3/1998 |
| JP | 10-264169 | | 10/1998 |
| JP | 11-034060 | | 2/1999 |
| JP | 11-300746 | | 11/1999 |
| JP | A 2001-18235 | | 1/2001 |

\* cited by examiner

*Primary Examiner*—James Mackey
(74) *Attorney, Agent, or Firm*—Oliff & Berridge PLC

(57) ABSTRACT

A vulcanizing mold for pneumatic tires includes a plurality of mold pieces for forming a tread portion of the tire, which can be assembled with each other in a circumferential direction of the tire. Each mold piece has a molding surface for forming a tread pattern of the tire tread portion, and end surfaces where adjacent mold pieces are in abutment with each other when they are assembled. The end surface of the mold piece includes an edge region adjacent to the molding surface and extending in a width direction of the tread portion. The mold piece has a vent passage communicating with atmosphere, formed of a narrow gap along the edge region over substantially entire width of the tread portion, and additional vent passage in the molding surface, formed of fine unevenness communicating with the narrow gap, and/or fine apertures at a region corresponding to a land in the tread portion and isolated from the narrow gap.

5 Claims, 15 Drawing Sheets

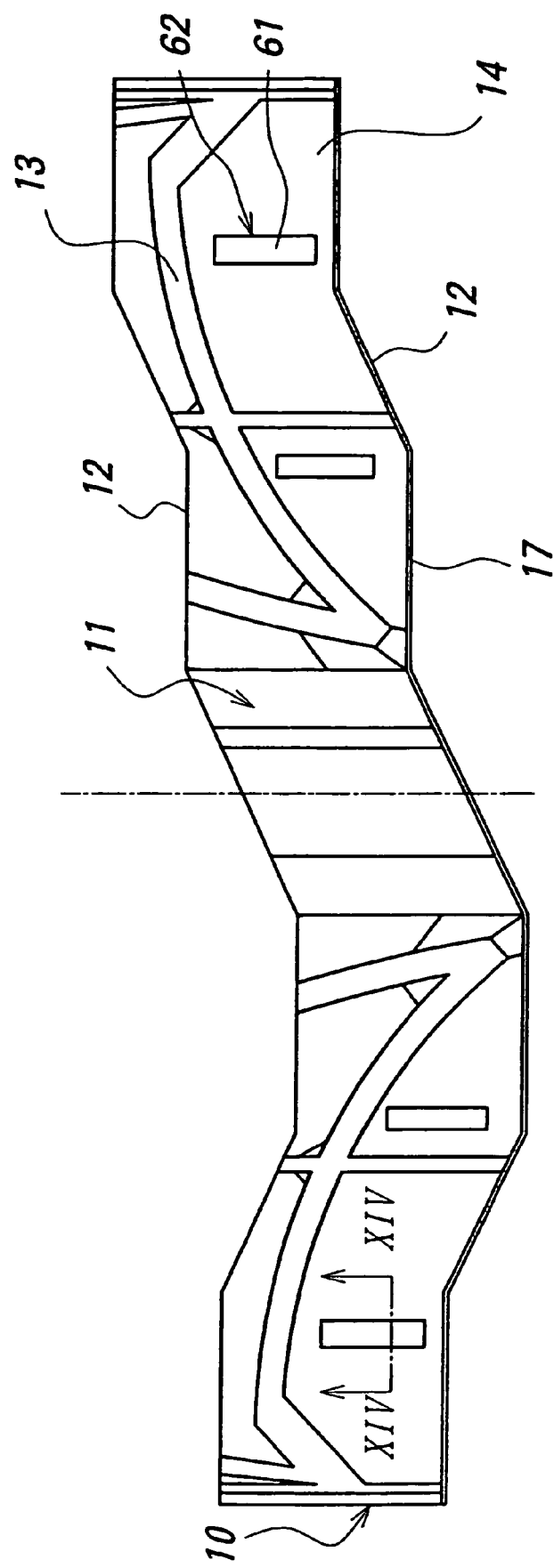

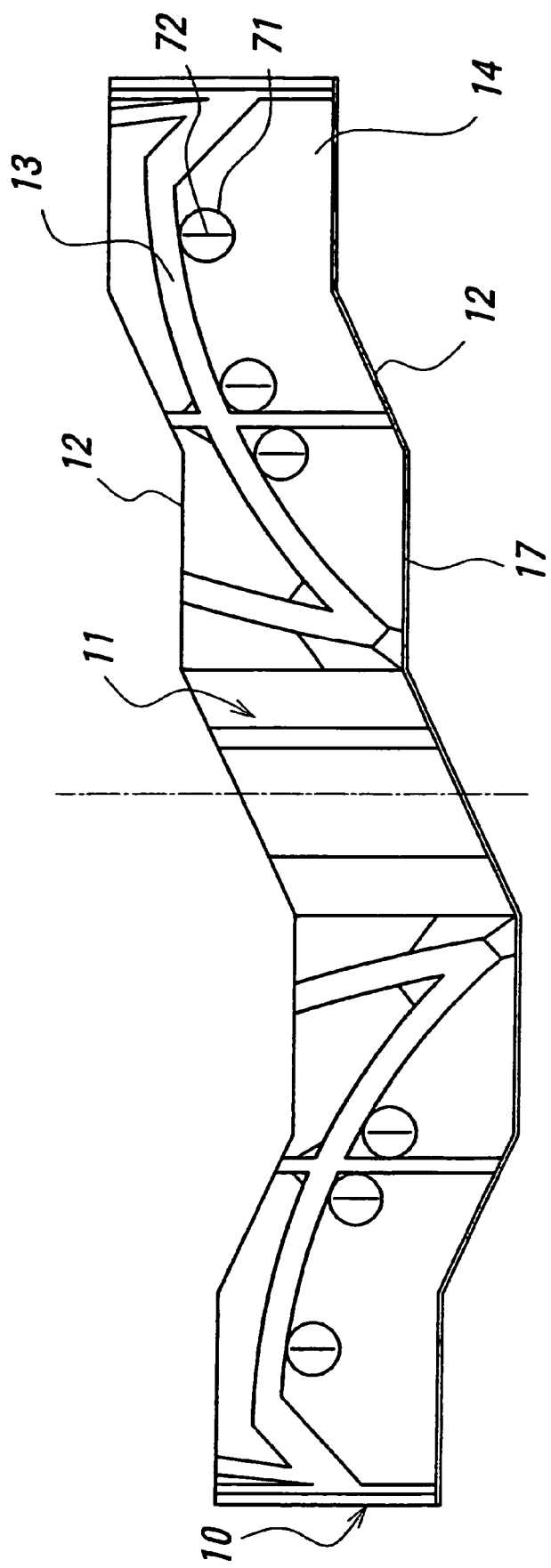

TIRE VULCANIZING MOLD

This is a Divisional of U.S. patent application Ser. No. 10/073,409 filed Feb. 13, 2002 now abandoned, which is hereby incorporated by reference in its entirety. This application claims priority to Japanese Patent Application No. 2001-037939, filed Feb. 15, 2001, which is hereby incorporated by reference in its entirety.

BACKGROUND OF THE INVENTION

1. Field of the Invention

The present invention relates to a vulcanizing mold for producing pneumatic tires.

2. Description of Related Art

Vulcanizing mold for pneumatic tires has inner surface that is provided with ridges for defining the tread pattern of the product tire. Thus, air tends to be trapped between the inner surface of the mold and the outer surface of a green tire upon vulcanization thereof. In particular, the ridges of the mold and the unvulcanized rubber of the green tire are brought into tight contact with the mold surface and thereby prevent effective discharge of air from the mold cavity. As a result, air trapped between the mold surface and the rubber surface forms voids or the like surface defects (so-called "bares") in the outer surface of the product tires, thereby lowering the commercial value of the product tire.

Therefore, it has been a conventional practice to provide a mold with vent holes in the form of fine apertures, for discharging air out of the mold cavity. In this instance, however, rubber tends to be extruded out of the vent holes to form spews on the tire surface, which degrade the appearance of the product tire. Thus, in order to provide an improved appearance of the product tire, time-consuming and/or troublesome countermeasures are often required. Such countermeasures include, for example, trimming of spews, and/or formation of increased number of fine apertures in the mold.

In view of these problems, JP-A-2001-18235 discloses a segmented-type vulcanizing mold including a plurality of mold pieces for forming a tread portion of the tire, which are assembled with each other in the circumferential direction of the tire. Each mold piece has a molding surface provided with various ribs for forming a tread pattern of the tire, and end surfaces where adjacent mold pieces are in abutment with each other when they are assembled. The end surface of the mold piece includes an edge region adjacent to the molding surface and extending in a width direction of the tread portion. The mold piece has a vent passage communicating with atmosphere, formed of a narrow gap that extends along the edge region partly in the width direction of the tread portion.

The vulcanizing mold disclosed in JP-A-2001-18235 proved to be highly advantageous in that the vent passage in the form of a narrow gaps along the edge region of each mold piece can be formed in a facilitated manner, more or less eliminating difficult and time-consuming machining of fine apertures in the mold pieces. However, even with the vulcanizing mold of such an improved structure, it is often necessary to apply vacuum in order to positively discharge air from the mold cavity and thereby effectively avoid formation of surface defects in the outer surface of the product tires. This leads to the necessity of providing vacuum pump device in combination with a complicated seal structure for the vulcanizing machine as a whole, besides increased equipment cost and running cost.

SUMMARY OF THE INVENTION

It is a primary object of the present invention to provide an improved vulcanizing mold capable of positively discharging air from the mold cavity without requiring application of vacuum.

It is another object of the present invention to provide an improved vulcanizing mold that can be produced and operated highly efficiently and at a relatively low cost.

According to a first aspect of the present invention, there is provided a vulcanizing mold for pneumatic tires, comprising a plurality of mold pieces for forming a tread portion of the tire, wherein the mold pieces can be assembled with each other side by side in a circumferential direction of the tire. The mold pieces each comprises a molding surface for forming a tread pattern of the tire tread portion, and end surfaces on both sides of the molding surface as seen in the circumferential direction of the tire, where adjacent mold pieces are in abutment with each other when they are assembled. The end surfaces of the mold piece each includes an edge region situated adjacent to the molding surface to extend in a width direction of the tread portion. Furthermore, the mold pieces each comprises (i) a first vent means comprised of a narrow gap formed by continuously removing said edge region over substantially entire width of the tread portion, wherein the first vent means is in communication with atmosphere, and (ii) a second vent means comprised of fine unevenness on the molding surface of the mold piece, wherein the second vent means is in communication with the first vent means.

In the structure of the vulcanizing mold according to the above-mentioned first aspect of the present invention, the narrow gap forming the first vent means extends along the edge region of the end surface adjacent to the molding surface of the mold piece, over substantially entire width of the tread portion. Thus, even when the gap is formed to have a reduced width, it is possible to positively discharge air from the mold cavity without requiring application of vacuum. The narrow gap with a reduced width is particularly advantageous for effectively preventing formation of spews. Moreover, the narrow gap along the end surface of the mold piece can be formed in a facilitated manner.

Furthermore, the molding surface of the mold piece has fine unevenness forming the second vent means that is in communication with the narrow gap of the first vent means. Thus, even immediately before the unvulcanized rubber of the green tire comes into tight contact with the molding surface corresponding to a land in the tread portion, air remaining therebetween can be effectively discharged into atmosphere, through the vent passage provided by the fine unevenness on the molding surface of the mold piece, and subsequently though the narrow gap of the first vent means. It is therefore possible to positively prevent formation of surface defects in the outer surface of the product tires, and to provide product tires with an improved appearance. The second vent passage ensuring an effective discharge of air from the mold cavity is in the form of fine unevenness and, hence, does not affect the appearance of the product tires.

It is preferred that the second vent means is comprised of narrow grooves, which are provided on the molding surface of the mold piece in a region corresponding to a land of the tread portion, so as to extend substantially continuously in the circumferential direction of the tire.

The above-mentioned arrangement of the second vent means makes it possible effectively to discharge air remaining within the mold cavity into the narrow gap of the first vent means and eventually into atmosphere, through the narrow grooves in the molding surface extending substantially continuously in the circumferential direction of the tire, thereby positively avoiding formation of surface defects in the outer surface of product tires. Formation of narrow grooves at the region of the molding surface that corresponds to a land in the tire tread portion is highly advantageous, since such surface region otherwise tends to cause air traps. Moreover, the narrow grooves in the molding surface extending substantially continuously in the circumferential direction of the tire can be formed in a facilitated manner without requiring complicated machining on the molding surface of the mold piece.

As for the cross-sectional dimension of the narrow grooves in the molding surface of the mold piece, it is preferred that each of the narrow grooves has a width and/or depth within a range of 0.1 mm to 0.3 mm. The width and/or depth of the narrow grooves in excess of 0.3 mm may affect the appearance of the product tires due to the narrow grooves by themselves, while the width and/or depth less than 0.1 mm make it difficult to effectively discharge air into the narrow gap of the first vent means at the end surface of the mold piece, and may cause surface defects in the product tires.

It is also preferred that the second vent means is comprised of an air passage extending along a root portion of a narrow rib, which is provided on the molding surface of the mold piece in a region corresponding to a land of the tread portion, so as to extend substantially continuously in the circumferential direction of the tire.

The above-mentioned arrangement of the second vent means also makes it possible effectively to discharge air remaining within the mold cavity into the narrow gap of the first vent means and eventually into atmosphere, through the air passage that extends along the narrow rib on the molding surface substantially continuously in the circumferential direction of the tire, thereby positively avoiding formation of surface defects in the outer surface of product tires. Formation of narrow ribs at the region of the molding surface that corresponds to a land in the tire tread portion is highly advantageous, since such surface region otherwise tends to cause air traps. The narrow ribs extending substantially continuously in the circumferential direction of the tire may be advantageously used to form narrow grooves in the outer surface of the product tire at a land in the tread surface, which are arranged with a regular pattern to provide a desired ornamental appearance. Moreover, the narrow rib defining the air passage along its root can be formed in a facilitated manner, simply by linearly forming a narrow groove in a master of the mold piece for preparing the latter by casting, so that the narrow groove in the master is complementary to the narrow rib in the mold piece.

As for the cross-sectional dimension of the narrow rib on the molding surface of the mold piece, it is preferred that the rib has a width of 0.3 mm or less and a height within a range of 0.1 mm to 0.3 mm. The width and/or height of the narrow rib in excess of 0.3 mm may affect the appearance of the product tire, while the height of less than 0.1 mm makes it difficult to effectively discharge air into the narrow gap of the first vent means at the end surface of the mold piece, and may cause surface defects in the product tires.

It is also preferred that the second vent means is comprised of a plurality of narrow grooves and at least one other groove intersecting the narrow grooves at not less than one point of each of them, wherein the narrow grooves and the at least one other groove are formed in the molding surface of the mold piece in a region corresponding to a land of the tread portion.

The above-mentioned arrangement of the second vent means makes it possible effectively to discharge air remaining within the mold cavity into the narrow gap of the first vent means and eventually into atmosphere, through the narrow grooves and at least one other groove in the molding surface, thereby positively avoiding formation of surface defects in the outer surface of product tires. Formation of these grooves in the region of the molding surface that corresponds to a land in the tire tread portion is highly advantageous, since such surface region otherwise tends to cause air traps. The narrow grooves and at least one other groove in the molding surface may be advantageously used to form narrow ribs in the outer surface of the product tire at a land in the tread surface, which are arranged with a regular pattern to provide a desired ornamental appearance. Moreover, these grooves can be formed in the molding surface in a facilitated manner, without requiring complicated machining of the molding surface of the mold piece.

As for the cross-sectional dimension of the narrow grooves and at least one other groove in the molding surface of the mold piece, it is preferred that each of these grooves has a width and/or depth within a range of 0.1 mm to 0.3 mm. The width and/or depth of the groove in excess of 0.3 mm may affect the appearance of the product tires due to the narrow grooves by themselves, while the width and/or depth less than 0.1 mm make it difficult to effectively discharge air into the narrow gap of the first vent means at the end surface of the mold piece, and may cause surface defects in the product tires.

It is also preferred that the second vent means is comprised of recesses that are in communication with each other, and formed by a surface treatment of the molding surface, at a region corresponding to a land in the tread portion, to have a surface roughness within a range of 20 μm to 60 μm.

The above-mentioned arrangement of the second vent means makes it possible effectively to discharge air remaining within the mold cavity into the narrow gap of the first vent means and eventually into atmosphere, through the recesses in the molding surface, thereby positively avoiding formation of surface defects in the outer surface of product tires. Formation of the recesses in the region of the molding surface that corresponds to a land in the tire tread portion is highly advantageous, since such surface region otherwise tends to cause air traps. The recesses can be readily formed by a suitable surface treatment, such as sand blasting of the molding surface, to have a desired surface roughness within a specified range. The recesses in the molding surface may be advantageously used to provide a mesh pattern in the outer surface region of the product tire at a land in the tread surface, which provides a desired ornamental appearance.

As for the magnitude of the surface roughness in the molding surface of the mold piece, the surface roughness in excess of 60 μm may affect the appearance of the product tire due to an excessive roughness in the outer surface, while the surface roughness of less than 20 μm makes it difficult to effectively discharge air into the narrow gap of the first vent means at the end surface of the mold piece, and may cause surface defects in the product tires.

According to another aspect of the present invention, there is provided a vulcanizing mold for pneumatic tires, comprising a plurality of mold pieces for forming a tread portion of the tire, wherein said mold pieces can be assembled with each other side by side in a circumferential direction of the tire. The mold pieces each comprises a molding surface for forming a tread pattern of the tire tread portion, and end surfaces on both sides of the molding surface as seen in the circumferential direction of the tire, where adjacent mold pieces are in abutment with each other when they are assembled. The end surfaces of the mold piece each includes an edge region situated adjacent to the molding surface to extend in a width direction of the tread portion. Furthermore, the mold pieces each comprises (i) a first vent means comprised of a narrow gap formed by continuously removing the edge region over substantially entire width of the tread portion, wherein the first vent means is in communication with atmosphere, and (ii) a second vent means comprised of one or more fine apertures, wherein the second vent means is formed in the molding surface of the mold piece at a region corresponding to a land in the tread portion and isolated from the first vent means, wherein the second vent means also is in communication with atmosphere.

The structure of the vulcanizing mold according to the second aspect of the present invention is essentially the same as the first aspect explained above, in that the narrow gap forming the first vent means extends along the edge region of the end surface adjacent to the molding surface of the mold piece, over substantially entire width of the tread portion. Thus, even when the gap is formed to have a reduced width, it is possible to positively discharge air from the mold cavity without requiring application of vacuum. The narrow gap with a reduced width is particularly advantageous for effectively preventing formation of spews. Moreover, the narrow gap along the end surface of the mold piece can be formed in a facilitated manner.

Additionally, the molding surface of the mold piece has one or more fine apertures forming the second vent means that is in communication with atmosphere, wherein the second vent means is situated at a region corresponding to a land in the tread portion and isolated from the first vent means. Thus, as the unvulcanized rubber of the green tire and the molding surface of the mold piece are being brought into tight contact with each other upon vulcanization, air between the unvulcanized rubber and the molding surface can be effectively discharged into atmosphere, directly through fine apertures forming the second vent means. It is therefore possible to positively prevent formation of surface defects in the outer surface of the product tires, and to provide product tires with an improved appearance. The second vent passage ensuring an effective discharge of air from the mold cavity is in the form of fine apertures and, hence, does not allow rubber to be extruded therethrough to form spews on the outer surface of the product tire. The appearance of the product tire is not affected since the second vent means is situated at the region of the molding surface, which otherwise tends to cause air traps.

It is preferred that the fine apertures forming the second vent means in the molding surface are formed in an air-permeable, sintered plate member. In this instance, the fine apertures can be realized in a facilitated manner, simply by using air-permeable, sintered plate member, without requiring time-consuming machining in the molding surface.

The sintered plate member has a pore size or filtration rating (JIS B0142) which is preferably within a range of 5 µm to 40 µm. The filtration rating less than 5 µm makes it difficult to effectively discharge air into atmosphere, and may cause surface defects in the product tires, beside that fine foreign matters tend to clog the apertures in the sintered plate member. On the other hand, filtration rating in excess of 40 µm tends to cause rubber material to be forced into the apertures of the sintered plate member, thereby clogging the apertures. The filtration rating within the preferred range effectively prevents clogging of the sintered plate member, which tends to cause surface defects in the product tire.

It is preferred that the fine aperture forming the second vent means in the molding surface is formed of a narrow clearance extending at least partly around an insert member inserted into the mold piece and having a tip end surface that forms part of said molding surface. In this way, it is possible to form the fine aperture of the second vent means in a positive and facilitated manner.

It is preferred that the narrow clearance around the insert member has a width within a range of 0.02 mm to 0.1 mm, and a depth within a range of 0.1 mm to 2 mm. The width less than 0.02 mm and/or the depth in excess of 2 mm lead to insufficient ability for discharging air, enhancing the tendency of surface defect formation and/or clogging of the narrow clearance by fine foreign matters. The width in excess of 0.1 mm increases the height of the rubber forced into the clearance, resulting in unsatisfactory appearance of the product tire. The depth less than 0.1 mm causes the rubber forced into the clearance to be left therein, thereby clogging the narrow clearance. The clogging, in turn, leads to insufficient ability for discharging air, thereby enhancing the tendency of surface defect formation.

It is preferred that the fine aperture forming the second vent means in the molding surface comprises a slit-like aperture in a top surface of a tubular pin member, which is inserted into the mold piece so that the top surface forms part of the molding surface. In this way, it is possible to form the fine aperture of the second vent means in a positive and facilitated manner.

It is preferred that the slit-like aperture has a width within a range of 0.02 mm to 0.1 mm, and a depth within a range of 0.1 mm to 2 mm. The width less than 0.02 mm and/or the depth in excess of 2 mm lead to insufficient ability for discharging air, enhancing the tendency of surface defect formation and/or clogging of the narrow clearance by fine foreign matters. The width in excess of 0.1 mm and/or the depth less than 0.1 mm causes the rubber forced into the clearance to be left therein, thereby clogging the narrow clearance. The clogging, in turn, leads to insufficient ability for discharging air, thereby enhancing the tendency of surface defect formation.

It is preferred that the narrow gap of the first vent means has a width within a range of 0.005 mm to 0.1 mm. The width less than 0.005 mm of the narrow gap leads to insufficient ability for discharging air, enhancing the tendency of surface defect formation. The width in excess of 0.1 mm tends to cause spews, resulting in inferior appearance of the product tire.

It is preferred that the first vent means further comprises a groove formed in each of the end surfaces at a location spaced from the molding surface, wherein the groove is wider than the narrow gap and in communication with the narrow gap and atmosphere. The groove provides an increased cross-sectional area of the air passage and thus serves to effectively discharge air into atmosphere.

It is preferred that the narrow gap of the first vent means extends along that portion of the molding surface, which corresponds to a land in the tread portion. Since air tends to be trapped at the molding surface portion corresponding to a land in the tread portion, where a space is defined by the ridges on the mold surface and the unvulcanized rubber, the narrow gap serves to effectively discharge air into atmosphere.

BRIEF DESCRIPTION OF THE DRAWINGS

The present invention will now be explained in further detail hereinafter, with reference to the preferred embodiments shown in the accompanying drawings.

FIG. 13 is a plan view showing the molding surface of a mold piece in the segmented tire mold according to a sixth embodiment of the present invention.

FIG. 15 is a plan view showing the molding surface of the mold piece in the segmented tire mold according to a seventh embodiment of the present invention.

DETAILED DESCRIPTION OF THE PREFERRED EMBODIMENT

Figure 1:
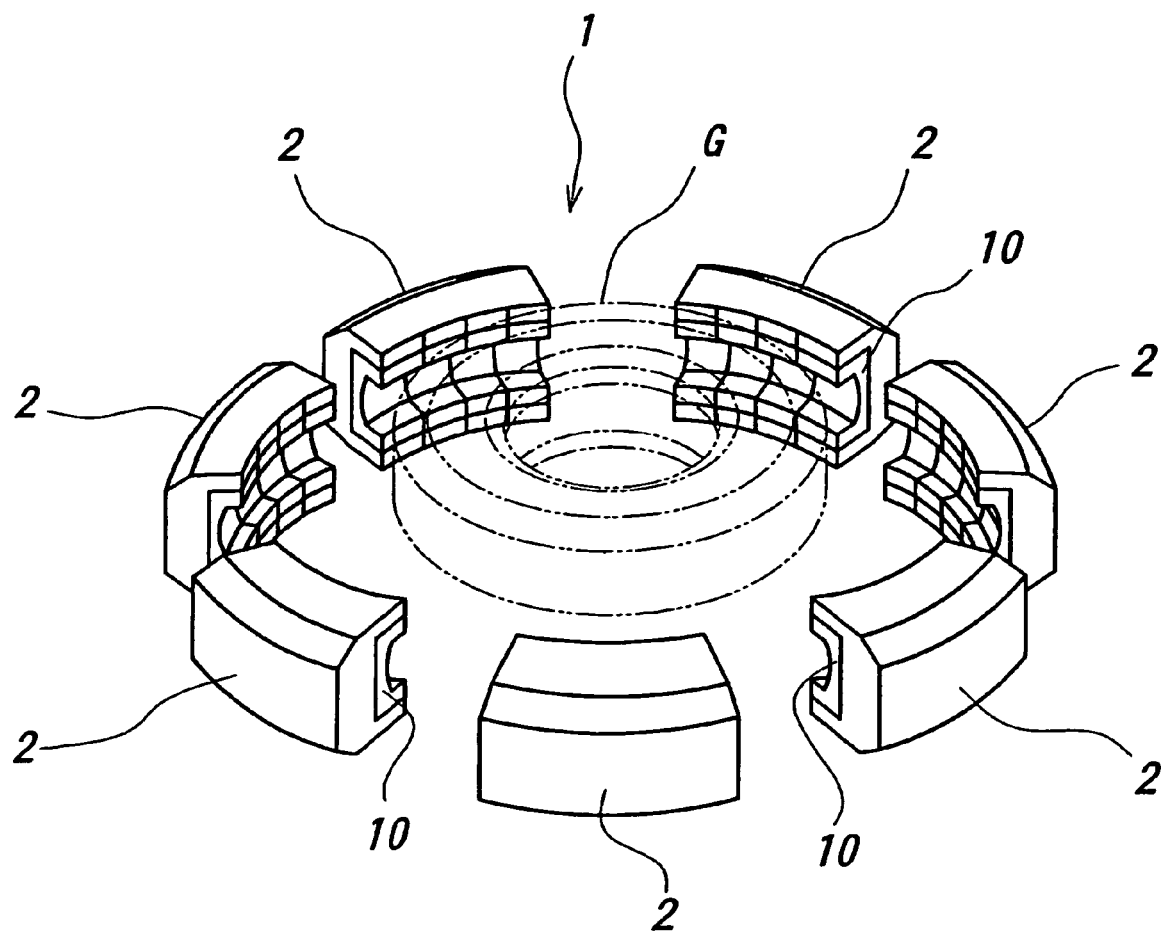
FIG. 1 is a schematic view showing the entirety of the segmented tire mold according to a first embodiment of the present invention.

A first embodiment of the present invention will be explained below with reference to FIGS. 1 through 6. FIG. 1 shows a tire vulcanizing mold 1, which is a segmented type mold circumferentially divided into a plurality of segments, typically into seven to nine segments of holders 2 (seven segments in FIG. 1). Each holder 2 serves to hold, on its inner surface, a plurality of segmented mold pieces for providing a desired pattern to a tread portion of a tire. To this end, it is assumed that the molding surfaces of the mold pieces are faced radially inwards. The holders 2 holding the associated mold pieces 10 are movable radially outwards or inwards. Thus, the holders 2 are moved radially outwards and thereby spread simultaneously so that a green tire G made of unvulcanized rubber material is set at the center of the holders 2. The holders 2 are then simultaneously moved radially inwards so that they are combined or assembled with one another, thereby forming an annular mold for vulcanizing the green tire G.

Figure 2:
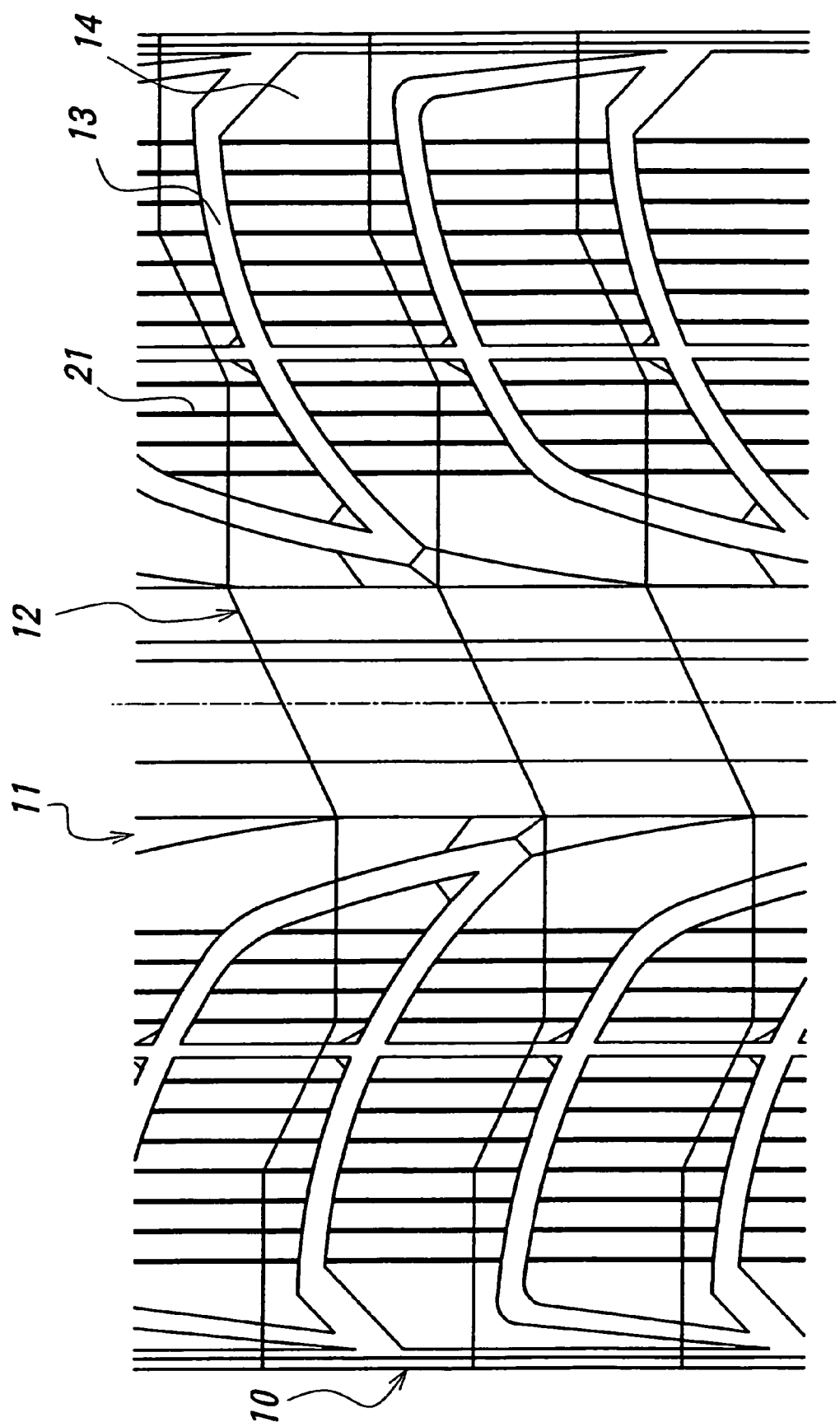
FIG. 2 is a plan view showing a part of the molding surface thereof.

FIG. 2 shows a part of the molding surface of the mold. The molding surface is formed by assembling the mold pieces 10 in the circumferential direction of the tire, i.e., by arranging the mold pieces 10 side-by-side at the abutment surfaces 12, respectively. Each abutment surface 12 continuously extends from one shoulder portion of a product tire to the other shoulder portion. The abutment surface 12 is provided with a narrow gap 17 along the edge portion adjacent to the molding surface. The narrow gap 17 forms part of vent means for discharging air from the mold cavity into atmosphere. The abutment surfaces 12 on the opposite sides of each mold piece is formed of seven planes that are connected to one another at six points, so that the seven planes on one side of the mold piece are parallel to the corresponding seven planes on the opposite side of the same mold piece, respectively. The molding surface 11 is provided with ridges 13 corresponding to grooves in the tread portion of a product tire. The ridges 13 define molding surfaces 14 that correspond to lands in the tread portion of the product tire. Furthermore, each molding surface 14 is provided with narrow grooves 21 that extend in the circumferential direction of the tire.

Upon vulcanization, the green tire G made of unvulcanized rubber material in brought into progressive adhesion to the molding surface 11 of the mold, such that each ridge 13 firstly adheres to the green tire G. On this occasion, air spaces are left on the molding surface 14, until the molding surface 14 completely adheres to the green tire G. As shown in FIG. 2, the narrow gaps 17 are provided along the molding surfaces 14 for lands, thereby allowing effective discharge of air from the mold cavity. Further, the molding surfaces 14 corresponding to lands are provided with narrow grooves 21 which extend in the circumferential direction of the tire so as to communicate with the narrow gaps 17, respectively. Thus, even just before the molding surfaces 14 completely adhere to the green tire G, air can be positively discharged to outside of the mold through the narrow grooves 21 in the molding surface 14 and the narrow gaps 17, without leaving air spaces in the mold cavity.

Figure 3:
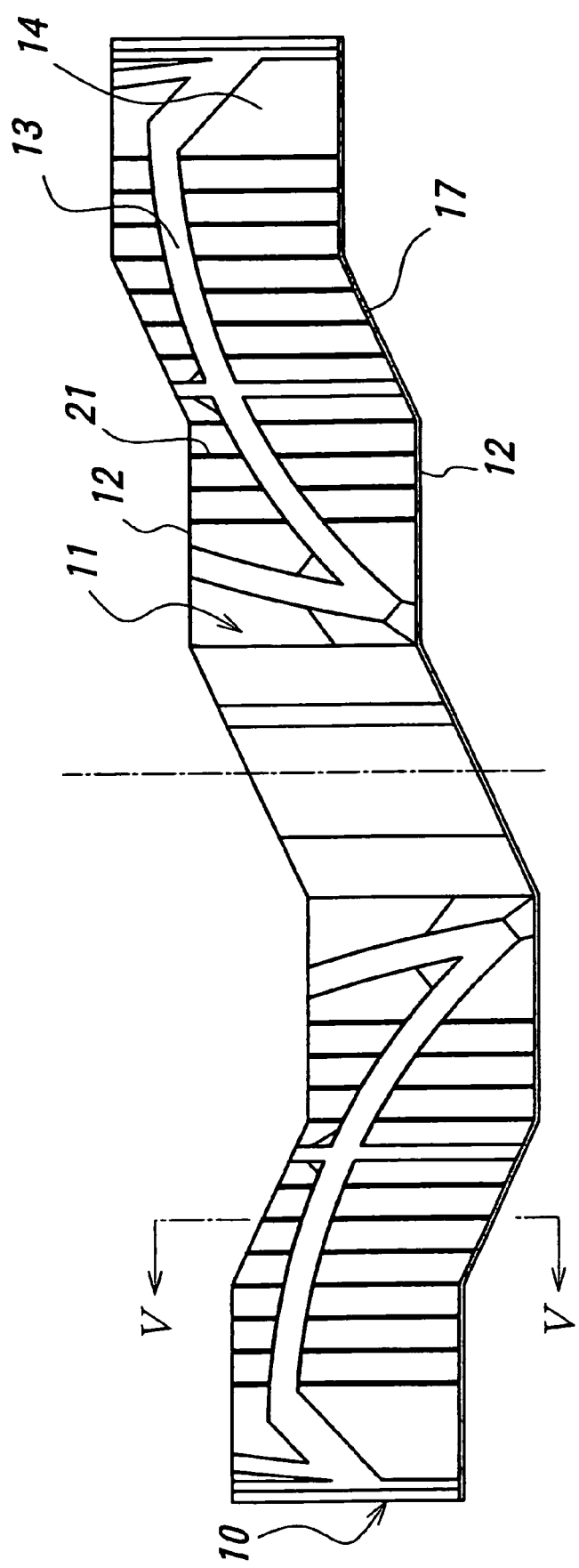
FIG. 3 is a plan view showing the molding surface of a mold piece.
Figure 4:
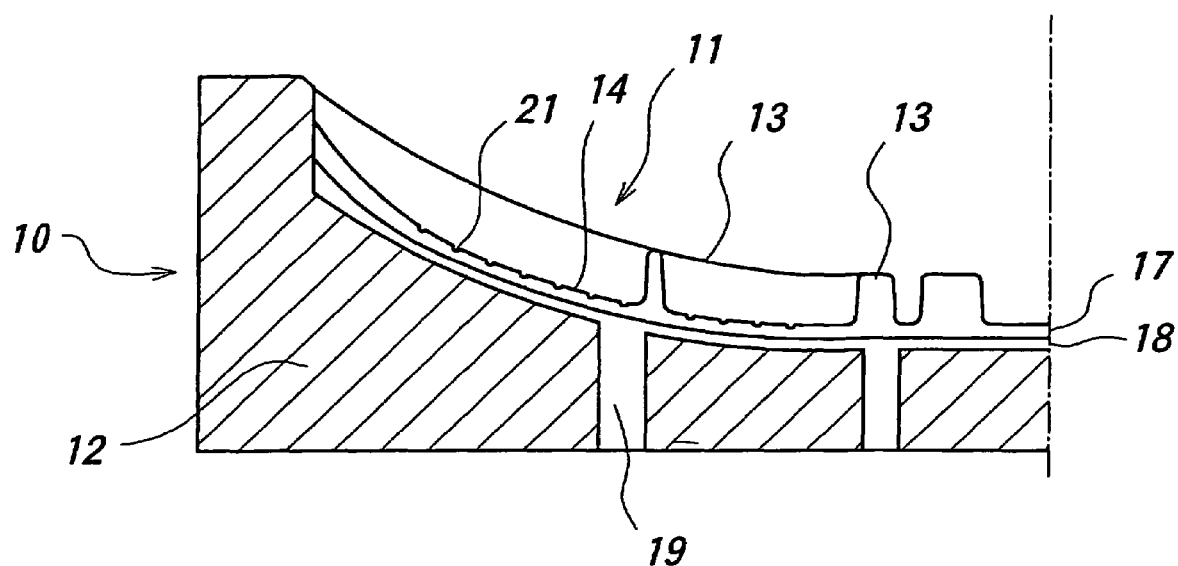
FIG. 4 is a side view as seen from the abutment surface side of the mold piece.
Figure 5:
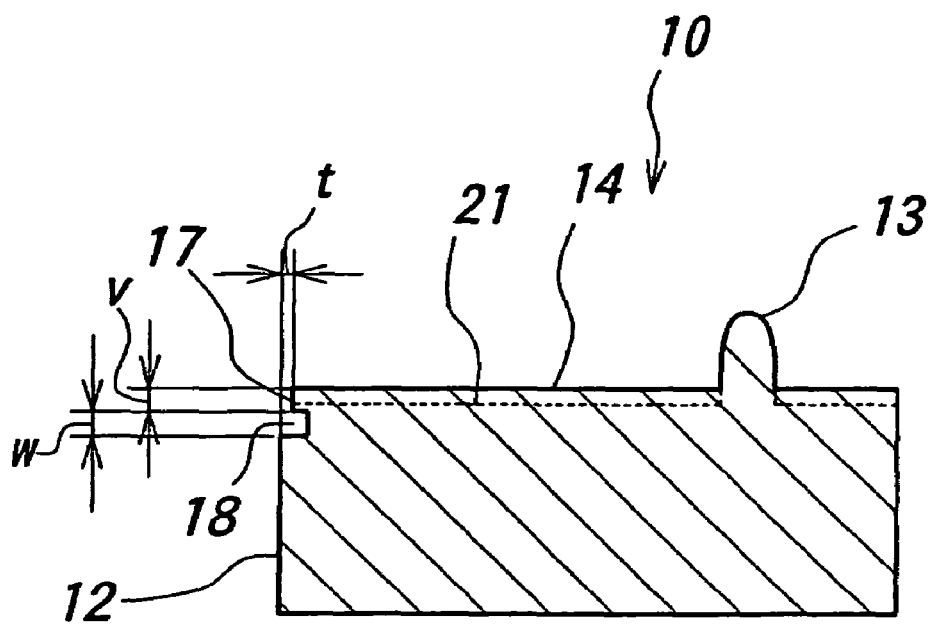
FIG. 5 is a cross-sectional view taken along the line V-V in FIG. 3.

FIG. 3 and FIG. 4 are views showing of one mold piece 10, as seen from the side of the molding surface 11 and from the side of abutment surface 12, respectively. The molding surface 11 of the mold piece 10 is gradually curved from the widthwise center of the tire toward a position just before each shoulder portion. Further, on the side of the molding surface 11, the side edge portion of one of abutment surfaces 12 is continuously cut out with a small width over the substantially the entirety of the abutment surface 12, including the ridges 13, such that the cut-out forms the narrow gap 17 between the neighboring mold pieces 10, as shown in FIG. 5, in which the narrow gap 17 has a width t of 0.03 mm and a depth v of 2 mm. The narrow gap 17 having a width t within a range of 0.005 to 0.05 mm makes it possible effectively to avoid formation of spews and occurrence of surface defects at locations near the abutment surfaces 12, without application of vacuum.

At a position deeper than the piece edge gap 17 on the abutment surface 12, as shown in FIG. 4 and FIG. 5, there is formed a groove 18 having a width larger than the width t of the narrow gap 17, and a depth w of 2 mm larger than the depth v of the piece edge gap 17. The depth w of the groove 18 may be within a range of 1 to 3 mm. Provision of the relatively wide groove 18 allows to increase the air passage sectional area, to thereby provide a higher air discharging effect. The groove 18 is communicated with the back surface of the mold piece 10 by passages 19 each having a sectional area larger than that of the narrow gap 17.

Figure 6:
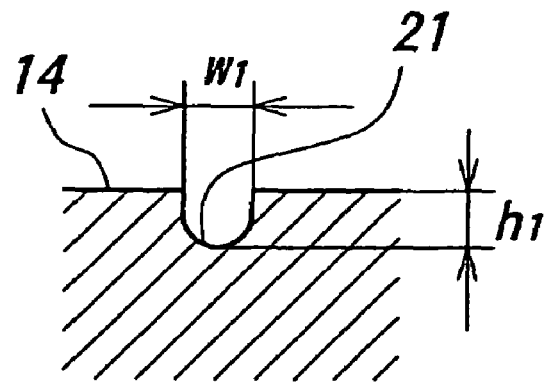
FIG. 6 is a cross-sectional view showing the details of the narrow groove in FIG. 4.

FIG. 6 is a cross-sectional view of the narrow groove 21 in the molding surface 14, that extends in the circumferential direction of the tire so as to communicate with the narrow gap 17. The groove 21 has, in its cross-section, a width w1 of 0.2 mm and a depth h1 of 0.2 mm. Preferably, the cross section of the groove 21 has dimensions including the width w1 of 0.1 to 0.3 mm and the depth h1 of 0.1 to 0.3 mm.

Figure 7:
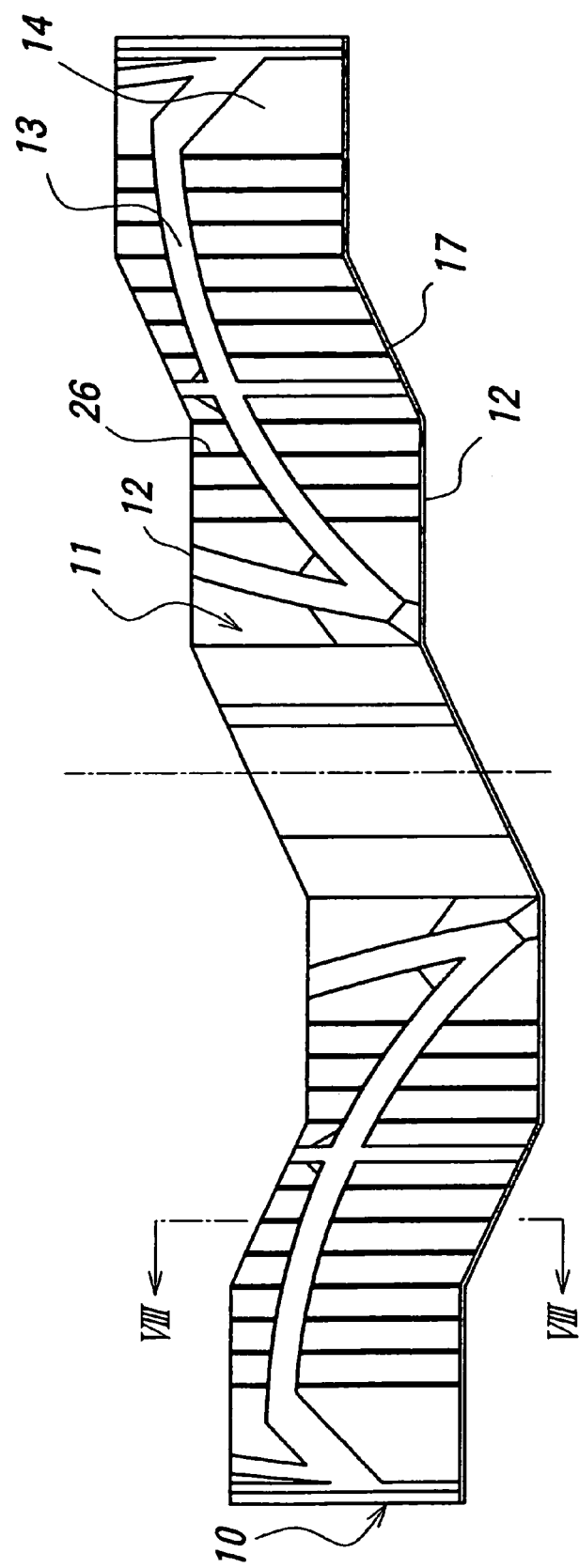
FIG. 7 is a plan view showing the molding surface of a mold piece in the segmented tire mold according to a second embodiment of the present invention.
Figure 8:
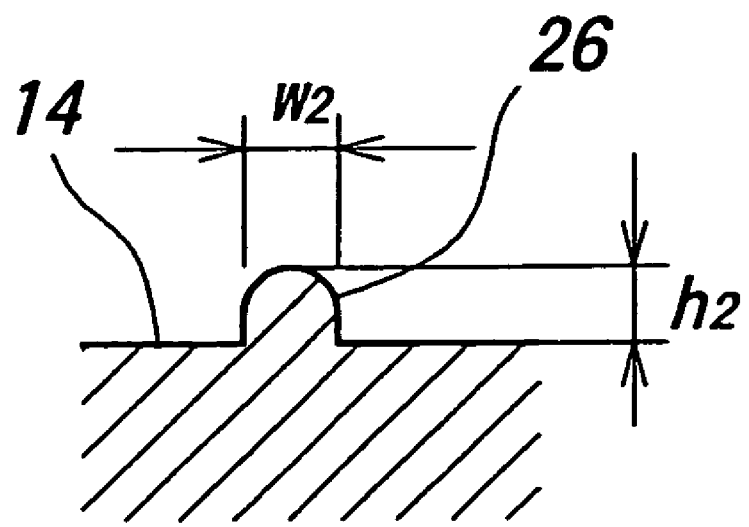
FIG. 8 is a cross-sectional view showing the details of the narrow rib in the mold piece shown in FIGS. 6 and 7.

A second embodiment of the present invention will be explained below with reference to FIGS. 7 and 8. FIG. 7 is a plan view showing a molding surface of a mold piece 10, and FIG. 8 is a cross-sectional view showing details of a narrow rib. In the second embodiment, the molding-surface 14 corresponding to the land of the tread portion is provided with narrow ribs 26 so that air passages communicating with the narrow gap 17 in the abutment surface 12 are formed on the molding surface 14 by the root portions of the narrow ribs 26, respectively. In this instance, air can be positively discharged to the exterior of the mold, via the air passage on the molding surface 14 and also via the narrow gaps 17 in the abutment surface 12, even just before the molding-surface 14 completely adheres to the green tire G, without leaving air spaces.

The rib 26 shown in FIG. 8 has a width w2 of 0.2 mm and a height h2 of 0.2 mm. Preferably, the width w2 is within a range of 0.3 mm or less, and the height h2 is within a range of 0.1 to 0.3 mm.

Figure 9:
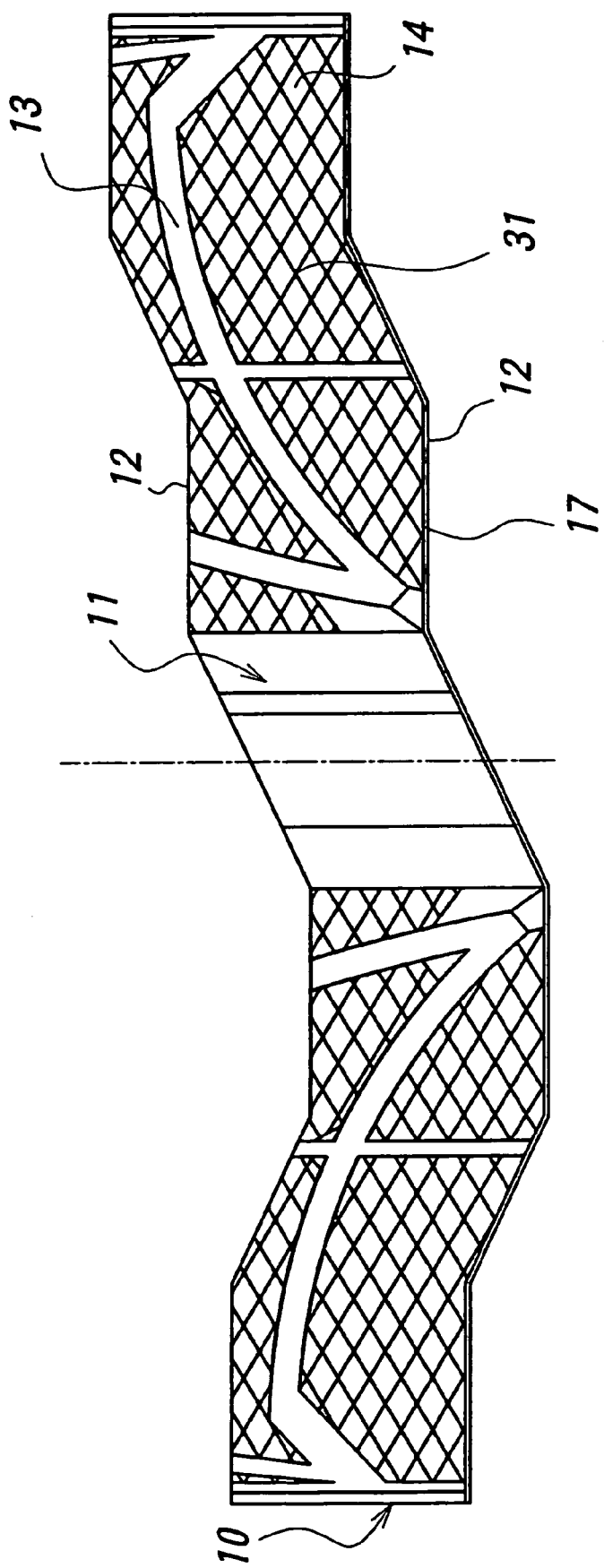
FIG. 9 is a plan view showing the molding surface of the mold piece in the segmented tire mold according to a third embodiment of the present invention.

FIG. 9 is a plan view showing the molding surface of a mold piece according to a third embodiment of the present invention. The molding surface 14 corresponding to each land of a tread portion is formed with air passages communicating with the narrow gap 17 in the abutment surface 12, by cross-patterned narrow grooves 31. In this instance, air can be positively discharged to the exterior of the mold, from piece edge gaps 17 via cross-patterned narrow grooves 31 in the molding surface 14, even just before the molding-surface 14 completely adheres to the green tire G, without leaving air spaces. Preferably, each groove has a width within a range of 0.1 mm to 0.3 mm and a depth within a range of 0.1 mm to 0.3 mm.

Figure 10:
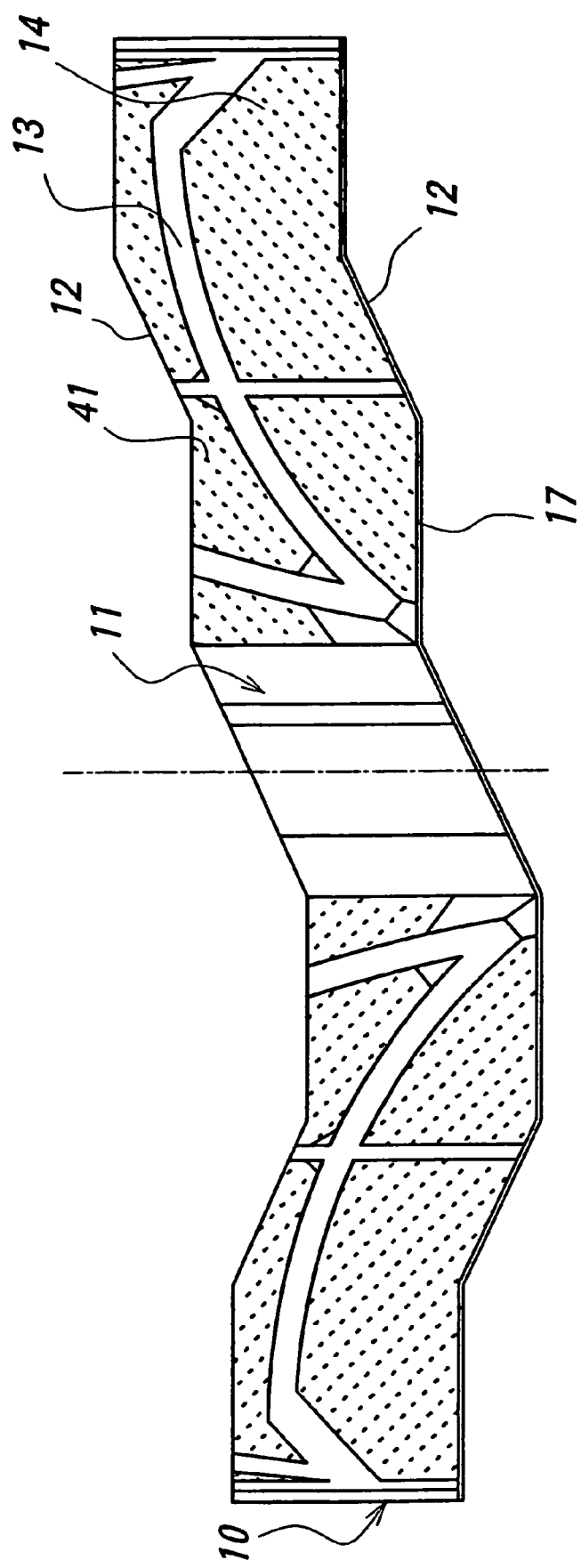
FIG. 10 is a plan view showing the molding surface of the mold piece in the segmented tire mold according to a fourth embodiment of the present invention.

FIG. 10 is a plan view showing the molding surface of a mold piece 10 according to a fourth embodiment of the present invention. The molding surface 14 corresponding to the land of the tread portion is finished to have a surface roughness of 40 µm. In this instance, air can be positively discharged to the exterior of the mold, via mesh-like concave portions of the roughened molding surface 41 of the piece having the surface roughness of 40 µm and also the narrow gap 17 in the abutment surface 12, even just before the molding surface 14 completely adheres to the green tire G, without leaving air spaces. The preferable range of the surface roughness is 20 µm to 60 µm.

Figure 11:
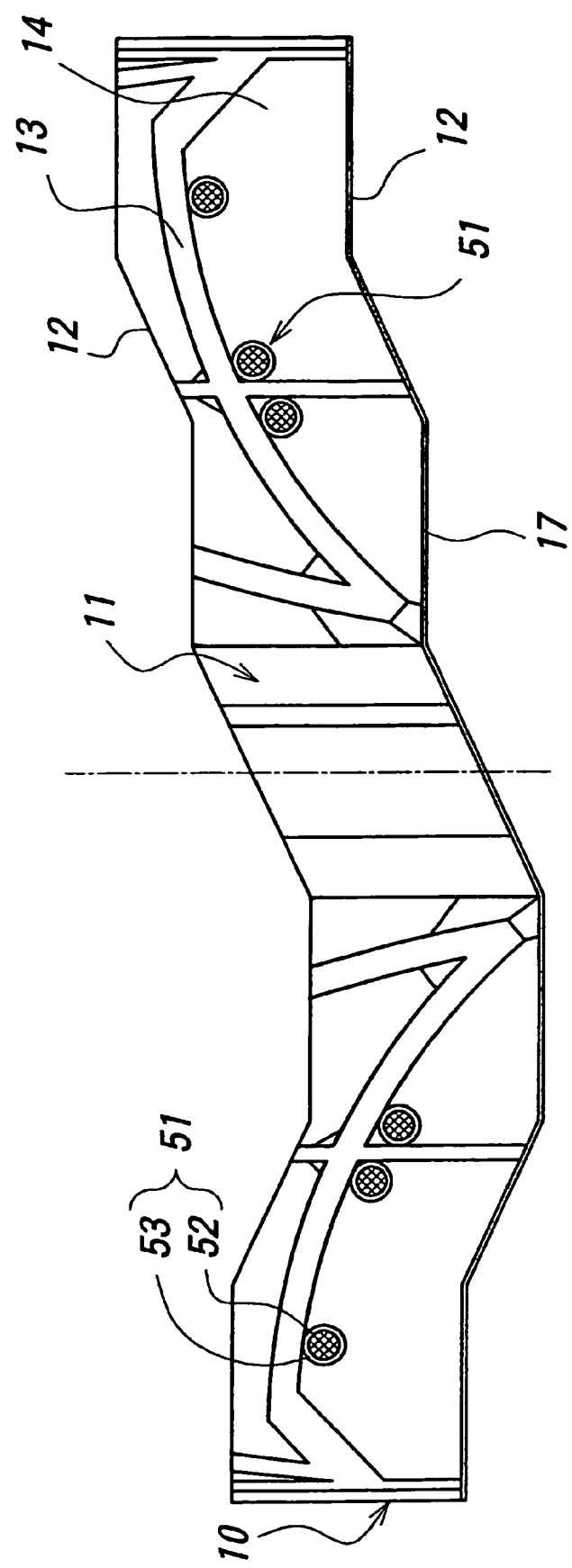
FIG. 11 is a plan view showing the molding surface of the mold piece in the segmented tire mold according to a fifth embodiment of the present invention.
Figure 12A:
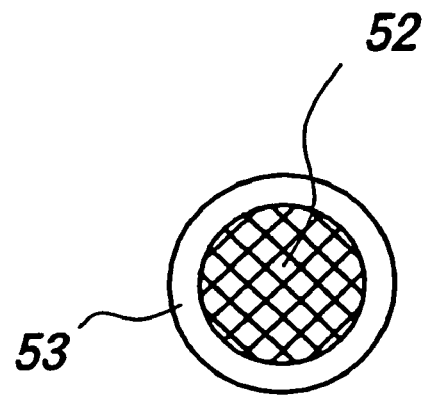
FIGS. 12(*a*) and 12(*b*) are plan view and cross-sectional view, respectively, showing the details of the fine air-vent apertures in the mold piece of FIG. 11.
Figure 12B:
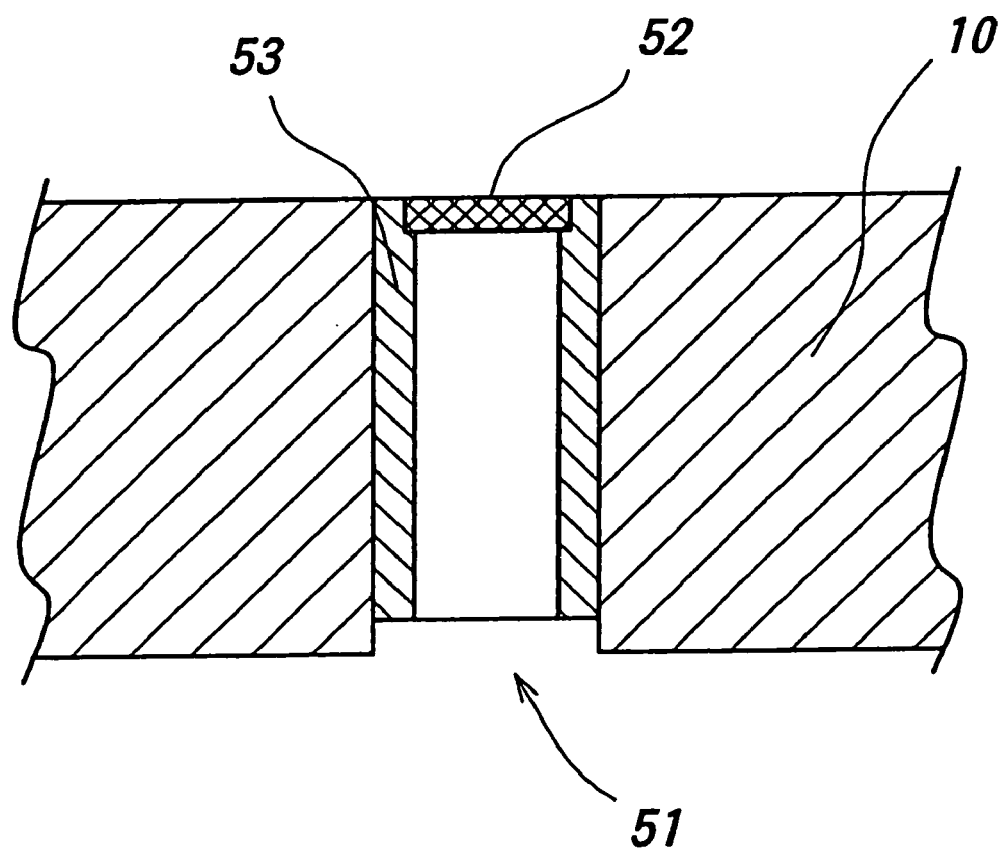

FIG. 11 is a plan view showing a molding surface of a mold piece 10 according to a fifth embodiment of the present invention. FIG. 12 is a cross-sectional view showing the details of an aperture. At each position of the molding-surface 14 corresponding to a land of the tread portion and spaced from the narrow gap 17 in the abutment surface 12, an air-permeable sintered plate member 52 is arranged for forming the air discharging fine aperture. A sleeve 53 attached with the sintered plate member 52 is embedded so that the end surface of the sleeve 53 and the outer surface of the sintered plate member 52 form part of the molding surface 14 of the mold piece 10. As shown in FIG. 11, sleeve 53 and air-permeable sintered plate member 52 can, for example, be arranged adjacent to ridges 13 or adjacent to a junction of ridges 13.

During vulcanization, air between the green tire G and the molding-surface 14 corresponding to the land of the tread portion is discharged to the exterior of the mold, through the narrow gap 17 in the abutment surface 12. When there is caused an air space that is not communicated with the narrow gap 17 while the green tire G adheres to the mold, such air space is left as residual air space and tends to cause a surface defect in the product tire. However, the air-permeable sintered plate members 52 are arranged at positions likely to cause residual air spaces so as to dissolve any residual air spaces and thereby effectively avoid formation of surface defects. The preferable range in terms of filtration rating of the sintered plate member 52 is 5 µm to 40 µm.

FIG. 12 is a cross-sectional view showing a mounting method of the sintered plate member 52. The base material of the mold piece 10, such as cast aluminum, is formed with a bore extending from the molding surface 14 toward the back surface. This bore is inserted with the sleeve 53 made of steel that is fixed to the bore by press-fit or the like. The sleeve 53 is provided with an attaching portion for the sintered plate member 52 thereto in a readily replaceable manner. Thus, even when the sintered plate member 52 is clogged to thereby deteriorate the air discharging effect, the clogged plate member 52 can be replaced by a new one by a suitable tool. In this way, the air discharging effect can be readily recovered, thereby allowing use of the mold over a prolonged period.

Figure 14:
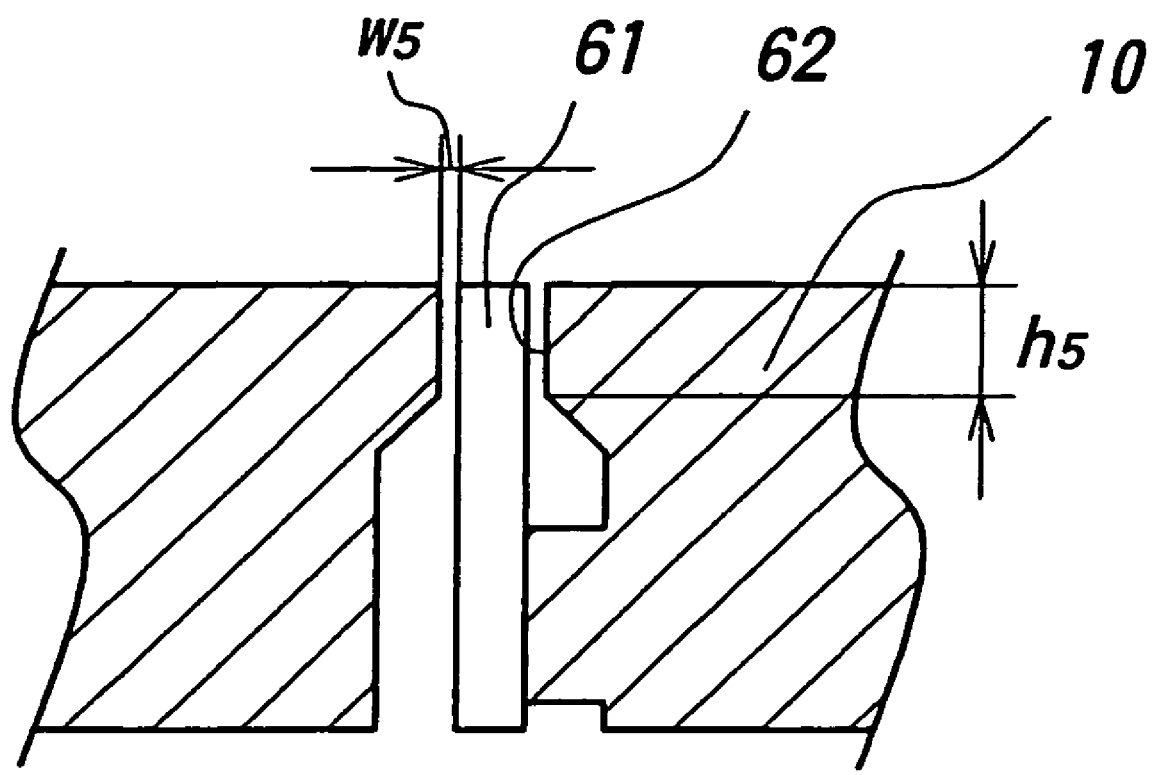
FIG. 14 is a sectional view taken along the line XIV-XIV in FIG. 13.

A sixth embodiment of the present invention will be explained below with reference to FIGS. 13 and 14. FIG. 13 is a plan view showing a molding surface of the mold piece 10, and FIG. 14 is a cross-sectional view of the mold showing details of an air discharging fine aperture. At the position of the molding surface 14 corresponding to the land of the tread portion and spaced from the narrow gap 17 in the abutment surface 12, there is inserted a pin 61 having a tip end surface forming part of the molding surface 14. A narrow clearance 62 is defined around the pin 61 for forming an air discharging fine aperture. Thus, air space caused at a location isolated from the narrow gap 17 can be directly discharged to the exterior of the mold, through the narrow clearance 62.

As shown in FIG. 14, the narrow clearance 62 around the pin 61 has a width w5, and extends over a depth h5 from the molding surface 14 of the mold piece 10. At that side of the narrow clearance 62 opposite to the molding surface, there is formed a relatively wide gap having a width larger than the width w5, thereby improving air discharging effect. The preferable range of the narrow clearance 62 is 0.02 mm to 0.1 mm for the width w5, and 0.1 mm to 2 mm for the depth h5.

A simple method for forming the narrow clearance 62 is explained below. Firstly, the pin 61 is prepared from a metal material different from the cast aluminum acting as the base material of the mold piece 10. The surface of the pin 61 is pressure-adhered with a water-soluble salt, such as sodium chloride or potassium chloride. The mold piece is then cast, with the pin 61 maintained in the desired location. Finally, the pressure-adhered salt on the pin 61 is eluted, thereby forming the narrow clearance 62 at an interface between the mold piece 10 and pin 61.

Figure 16A:
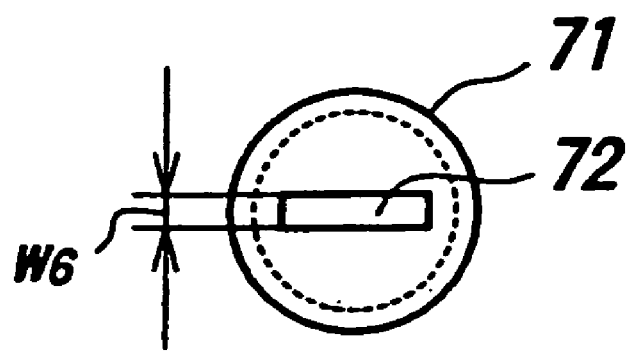
FIGS. 16(*a*) and 16(*b*) are plan view and cross-sectional view respectively, showing the details of fine air-vent apertures in the mold piece.
Figure 16B:
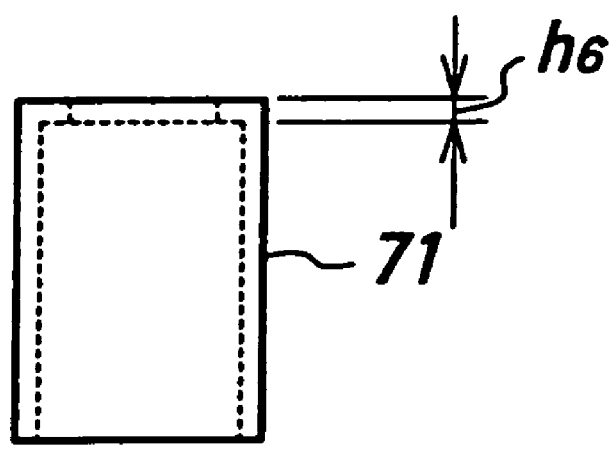

A seventh embodiment of the present invention will be explained below with reference to FIGS. 15 and 16. FIG. 15 is a plan view showing a molding surface of the mold piece 10, and FIGS. 16(a) and 16(b) is a plan view and a cross-sectional view, respectively, showing the details of air discharging fine aperture. At the position of the molding-surface 14 corresponding to the land of the tread portion and isolated from the narrow gap 17 in the abutment surface 12, there is arranged a cylindrical member 71 having a top surface, which forms part of the molding surface 14. The top surface of the cylindrical member 71 is provided with a slit 72 forming an air discharging fine aperture. The air spaces caused at a location isolated from the narrow gap 17 can be directly discharged to the exterior of the mold, through each slit 72. The preferable range of the slit 72 is 0.02 mm to 0.1 mm for width w6, and 0.1 mm to 2 mm for depth h6. As shown in FIG. 15, slit 72 and cylindrical member 71 can, for example, be arranged adjacent to ridges 13 or adjacent to a junction of ridges 13.

It will be appreciated from the foregoing detailed description that the vulcanizing mold according to the present invention is capable of positively discharging air near the narrow gap in the abutment surface without forming spews or surface defects, without application of vacuum. The air spaces caused at locations spaced from the narrow gaps can also be discharged via air passages communicated with the narrow gaps; or directly through fine apertures provided at locations isolated from the narrow gaps; to thereby avoid occurrence of spews or surface defects.

While the present invention has been described above with reference to some preferred embodiments, they were presented by way of examples only, and various changes or modifications may be made without departing from the scope of the invention as defined by the appended claims.

The invention claimed is:

1. A vulcanizing mold for pneumatic tires, comprising a plurality of mold pieces for forming a tread portion of the tire, wherein said mold pieces can be assembled with each other side by side in a circumferential direction of the tire;

said mold pieces each comprising a molding surface for forming a tread pattern of the tire tread portion, and end surfaces on both sides of the molding surface as seen in the circumferential direction of the tire, where adjacent mold pieces are in abutment with each other when they are assembled, said end surfaces of the mold piece each including an edge region situated adjacent to the molding surface to extend in a width direction of the tread portion;

said mold pieces each comprising (i) a first vent means comprised of a narrow gap formed by continuously removing said edge region over substantially entire width of the tread portion, said first vent means being in communication with atmosphere, and (ii) a second vent means comprised of fine unevenness on the molding surface of the mold piece, said second vent means being in communication with said first vent means, wherein said second vent means is comprised of a plurality of narrow grooves, said narrow grooves including a first set and a second set that each extend at an angle relative to a line extending circumferentially around the mold, the second set extending at a second angle which is at least 90° apart from the first angle, wherein the first set and second set of narrow grooves intersect each other at least at one point on the surface of the mold, and, said narrow grooves being formed in the molding surface of the mold piece in a region corresponding to a land of the tread portion.

2. A vulcanizing mold according to claim 1, wherein each of said grooves has a width within a range of 0.1 mm to 0.3 mm and a depth within a range of 0.1 mm to 0.3 mm.

3. A vulcanizing mold according to claim 1 wherein said narrow gap of said first vent means has a width within a range of 0.005 mm to 0.1 mm.

4. A vulcanizing mold according to claim 1, wherein said first vent means is further comprised of a groove formed in each of said end surfaces at a location spaced from said molding surface, said groove being wider than said narrow gap and in communication with said narrow gap and atmosphere.

5. A vulcanizing mold according to claim 1, wherein said narrow gap comprised in said first vent means extends along that portion of said molding surface, which corresponds to a land in the tread portion.

\* \* \* \* \*